United States Patent
Harding (10) Patent No.: US 10,958,774 B1
(45) Date of Patent: Mar. 23, 2021

(54) SYSTEM FOR PROVIDING A CALLED PARTY WITH IDENTITY VERIFICATION OF THE CALLING PARTY

(71) Applicant: BANK OF AMERICA CORPORATION, Charlotte, NC (US)

(72) Inventor: Paul Joseph Harding, Langdon Hills (GB)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 16/786,687

(22) Filed: Feb. 10, 2020

(51) Int. Cl.
*H04W 12/06* (2021.01)
*H04M 1/665* (2006.01)

(52) U.S. Cl.
CPC ......... *H04M 1/665* (2013.01); *H04W 12/068* (2021.01); *H04M 2203/6027* (2013.01); *H04M 2207/18* (2013.01)

(58) Field of Classification Search
CPC ............................ H04M 1/665; H04W 12/068
See application file for complete search history.

(56) References Cited

U.S. PATENT DOCUMENTS

| | | | |
|---|---|---|---|
| 8,204,208 B2 * | 6/2012 | Goldman | H04M 3/382 379/342 |
| 8,290,130 B2 | 10/2012 | Cheon et al. | |
| 8,571,011 B2 * | 10/2013 | Alt | H04L 61/2575 370/352 |
| 9,071,683 B1 | 6/2015 | Somes et al. | |
| 9,264,539 B2 | 2/2016 | Lin | |
| 10,440,177 B1 * | 10/2019 | Vincent | H04W 8/183 |
| 2008/0181379 A1 | 7/2008 | Chow et al. | |

* cited by examiner

*Primary Examiner* — Michael T Vu
(74) *Attorney, Agent, or Firm* — Michael A. Springs; Moore & Van Allen PLLC; James C. Edwards (57) ABSTRACT

A called-party is provided identity verification of the calling-party during a telephone call. A call request is received for a calling-party to place a call with a called-party. A call management platform or the like associates a passcode with the call request and communicates the passcode to an online network resource and/or a mobile application associated with the calling entity. During the call, in the event the called-party requests identity verification of the calling-party, the called-party is requested to access the online network resource or the mobile application. In response to the called-party logging in to the online network resource or the mobile application, the passcode is communicated from the call management platform to the called-party and is presented with a display of the passcode. The calling-party announces the passcode to the called-party which matches the passcode displayed as a means of verifying the identity of the calling-party.

20 Claims, 3 Drawing Sheets

FIG. 3

SYSTEM FOR PROVIDING A CALLED PARTY WITH IDENTITY VERIFICATION OF THE CALLING PARTY

FIELD

The present invention relates to information security and, more specifically, providing a called-party with identity verification of the calling-party during a telephone call.

BACKGROUND

Large enterprises, such as financial institutions, utility companies, merchants or the like often have the need to contact users via telephone calls. At the onset of such calls, the calling-party typically conducts a security check (i.e., identity verification) to ensure that the called-party is, in fact, the actual user that the calling-party is attempting to contact. In the European Union (EU), under General Data Protection Regulations (GDPR), it is a matter of law that the calling-party conduct such security checks. Typically, this security check involves asking the called-party to confirm personal information known to the calling entity, such as name, physical or email address, portions of identifying numbers or the like.

However, no simplistic approach is provided that allows for the called-party to verify the identity of the calling-party (i.e., verify that the call is coming from the identity that the calling-party purports to represent). In this regard, without proper verification, the calling-party may be a threat/bad actor claiming to represent the calling-party as a means of deceiving the called-party into divulging personal information. The current approach to providing calling-party identity verification to the called-party requires the called-party to call back at a known calling-party number.

Therefore, a need exists to develop systems, methods, computer program products and the like that provide the called-party with identity verification of the calling-party during a telephone call. In this regard, the desired systems, methods, computer program products and the like should provide such identity verification absent the need to have the called-party call back on a known calling-party number. In addition, the desired systems, methods, computer program products and the like should provide such identity verification absent the need to exchange personal information between the calling-party and the called-party. Moreover, an additional need exists to develop systems, methods and computer program products and the like that not only provide the called-party with identity verification during the call, but also provide the calling-party the ability to verify the identity the called-party absent the need for the called-party to provide any personal information.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing for systems, computer-implemented methods, computer program products and the like for verifying the identity of a calling-party (i.e., the entity initiating or making the telephone call) during a telephone call. In certain instances, the called-party (i.e., the entity receiving the telephone call) may be unsure that the calling-party is, in fact, who they purport to be or may request identity verification of the calling-party. The present invention provides for such identity verification without having to have the called-party call back at a known calling-party number and without having either party exchange personal information.

Specifically, according to the present invention, a call management platform or some other customer/client relationship management system receives a call request to contact the calling-party. The call management platform associates a passcode with the call request. During the call, in the event the called-party requests identity verification of the calling-party, the called-party is requested to access the online network resource or the mobile application. In response to the called-party logging-in to the online network resource or the mobile application, the online network resource or website requests the passcode from the call management platform and in response to receiving the passcode displays the passcode to the called-party. Once displayed, the calling-party announces the passcode to the called-party, which matches the passcode displayed as the means for verifying the identity of the calling-party to the called-entity In additional embodiments of the invention, during the same telephone call, the calling-party is provided identity verification of the called-party (i.e., the called-party is, in fact, the party that the calling-entity desires to contact) without the called-party having to announce or otherwise provide any personal information. Specifically, in response to the called-party logging into the online network resource or mobile application, the online network resource or the mobile application generates a single-use passcode that is then communicated to the call management platform and displayed to the called-party at the online network resource or the mobile application. Since the called-party previously logged into the online network resource or mobile application, which are associated with the calling-party, the called-party only needs to announce or otherwise provide the passcode to the calling-party. Since the passcode announced by the called-party is the same passcode that was communicated to the call management platform, the identity of the called-party is deemed to be verified.

A system for providing a called-party with identity verification of a calling-party defines first embodiments of the invention. The system includes at least one of least one of (i) an online network resource (e.g., a website) associated with the calling-party, and (ii) a mobile application associated with the calling-party. Additionally, the system includes a call management platform that is stored in memory and executable by one or more computing processors. The call management platform is configured to receive a call request that requests the calling-party to initiate a telephone call with the called-party, and associate a first passcode with the call request and initiate communication of the first passcode to at least one of the online network resource and the mobile application. The online network resource and the mobile application are configured to, in response to the called-party accessing the online network resource or the mobile application during the telephone call, receive authentication credentials from the called-party, and, in response to authenticating the called-party based on the authentication credentials, display, on a called-party device, the first passcode. In response to displaying the first passcode, the calling-party announces the first passcode to the called-party and the called-party recognizes the announced first passcode as matching the first code displayed on the called-party device. This provides the called-party with identity verification of the calling-party.

In further embodiments of the system, the online network resource and the mobile application are further configured to, in response to authenticating the called-party, generate a single-use second passcode, communicate the second passcode to the call management platform, and display the second passcode to the called-party. In such embodiments of the system, the called-party announces the second passcode to the calling-party and the calling-party matches the announced second passcode with the second passcode previously communicated to the call management platform to provide called-party identity verification to the calling-party.

In further specific embodiments of the system, the call management system is further configured to generate the first passcode that is specific to the telephone call (i.e., a one-time only passcode). In such embodiments of the system, the call management system may be further configured to generate the first passcode in response to initiating the telephone call and display, on a calling-party device, the first passcode.

In other specific embodiments of the system, the call management system is further configured to initiate communication of a text message to the called-party. The text message is configured to include a hyperlink that is configured to provide the called-party entrance to the online network resource (i.e., the called-party will still be required to authenticate in order to gain access to the online network resource). In related embodiments of the invention, the call management system is further configured to initiate communication of the text message to the called-party during the telephone call or prior to the telephone call.

In other specific embodiments of the invention, the call management system is further configured to communicate a signal to the mobile application to display, on the called-party device, a mobile application notification that is configured to receive a user input that launches the mobile application. In related embodiments of the system, the call management system is further configured to signal the mobile application to display a mobile application notification during the telephone call or prior to the telephone call.

Moreover, in further embodiments of the system, the call management platform is further configured to initiate communication of the first passcode and a name of the calling-party to the at least one of the online network resource and the mobile application. In such embodiments of the system, the online network resource and the mobile application are further configured to display, on the called-party device, the first passcode and the name of the calling-party. Additionally, in other embodiments of the invention, the online network resource and/or mobile application may be configured to display a hyperlink, which upon activation, provides the called-party with an ability to review the call (i.e., provide feedback or the like).

A computer-implemented method for providing a called-party with identity verification of a calling-party defines second embodiments of the invention. The method is executed by one or more computing device processors. The method includes receiving an input that requests the calling-party to initiate a telephone call with the called-party. The method further includes, associating a first passcode with the call request and initiating communication of the first passcode to at least one of an online network resource associated with the calling-party and a mobile application associated with the calling-party. In addition, the method includes in response to the called-party accessing, via a called-party device, one of the online network resource or the mobile application during the call, receiving, at the online network resource or the mobile application, authentication credentials from the called-party, and in response to authenticating the called-party based on the authentication credentials, displaying, at the online network resource or within the mobile application, the first passcode. In response to displaying the first passcode, the calling-party announces the first passcode to the called-party and the called-party recognizes the announced first passcode as matching the first code displayed on the called-party device. This provides the called-party with identity verification of the calling-party.

In specific embodiments the computer-implemented method further includes, in response to authenticating the called-party, generating, at the online network resource or within the mobile application, a single use second passcode, communicating the second passcode to the call management platform, and displaying, on the called-party device, the second passcode. In such embodiments, the called-party announces the second passcode to the calling-party and the calling-party matches the announced second passcode with the second passcode previously communicated to the call management platform to provide called-party identity verification to the calling-party.

In other specific embodiments the computer-implemented further includes generating the first passcode in response to initiating the telephone call, and displaying, on a calling-party device, the first passcode In still further specific embodiments, the computer-implemented method further includes initiating communication of a text message to the called-party. The text message is configured to include at a hyperlink that is configured to provide the called-party entrance to the online network resource.

In other further embodiments the computer-implemented further includes signaling the mobile application to display a mobile application notification that is configured to receive a user input that launches the mobile application.

Moreover, in additional embodiments of the computer-implemented method, initiating communication of the first passcode further includes initiating communication of the first passcode and a name of the calling-party to the at least one of the online network resource and the mobile application. In such embodiments, displaying, at the online network resource or within the mobile application, the first passcode, further includes displaying, at the online network resource or within the mobile application, the first passcode and the name of the calling-party. Additionally, in other embodiments of the invention, the online network resource and/or mobile application may be configured to display a hyperlink, which upon activation, provides the called-party with an ability to review the call (i.e., provide feedback or the like).

A computer program product comprising a non-transitory computer-readable medium defines third embodiments of the invention. The computer-readable medium includes a first set of codes for causing a computer processor to receive a call requests that requests the calling-party to initiate a telephone call with the called-party. Additionally, the computer-readable medium includes a second set of codes for causing a computer processor to associate a first passcode with the call request and initiate communication of the first passcode to at least one of an online network resource associated with the calling-party and a mobile application associated with the calling-party. In addition, the computer-readable medium includes a third set of codes for causing a computer processor, in response to the called-party accessing, via a called-party device, one of the online network resource or the mobile application during the call, (a) receive, at the online network resource or the mobile application, authentication credentials from the called-party, and in response to authenticating the called-party based on the authentication credentials, (b) display, at the online network resource or within the mobile application, the first passcode. In response to displaying the first passcode, the calling-party announces the first passcode to the called-party and the called-party recognizes the announced first passcode as matching the first code displayed on the called-party device. This provides the called-party with identity verification of the calling-party.

In further embodiments of the computer program product, the non-transitory computer-readable medium further includes a fourth set of codes for causing a computer processor to, in response to authenticating the called-party, generate, at the online network resource or within the mobile application, a single use second passcode. In addition, the computer-readable medium includes a fifth set of codes for causing a computer processor to communicate the second passcode to the call management platform, and a sixth set of codes for causing a computer processor to display, on the calling-party device, the second passcode. In such embodiments of the computer program product, the called-party announces the second passcode to the calling-party and the calling-party matches the announced second passcode with the second passcode previously communicated to the call management platform to provide called-party identity verification to the calling-party.

In still further embodiments of the computer program product, the non-transitory computer-readable medium further includes a fourth set of codes for causing a computer processor to generate the first passcode in response to initiating the telephone call, and a fifth set of codes for causing a computer processor to display, on a calling-party device, the first passcode.

Thus, according to embodiments of the invention, which will be discussed in greater detail below, the present invention provides a called-party with identity verification of the calling-party during a telephone call. The identity verification of the calling-party occurs without the called-party being required to call back at a known called-party number and without the need to exchange personal information. In additional embodiments of the invention, during the call, the calling-party is provided with identity verification of the called-party without the called-party having to provide any personal information. As such embodiments of the invention provide for both the called-party and the called-party to verify the identity of one another without either party being required to provide any personal information.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the disclosure in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as an apparatus, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatus. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer-implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Thus, according to embodiments of the invention, which will be described in more detail below, for systems, computer-implemented methods, computer program products and the like for verifying the identity of a calling-party (i.e., the entity initiating or making the telephone call) during a telephone call. In certain instances, the called-party (i.e., the entity receiving the telephone call) may be unsure that the calling-party is, in fact, who they purport to be or may request identity verification of the calling-party. The present invention provides for such identity verification without having to have the called-party call back at a known calling-party number and without having either party exchange personal information.

Specifically, according to the present invention, a call management platform or some other customer/client relationship management system receives a call request to contact the calling-party via a telephone call.

The call management platform associates a passcode with the call request. The passcode may be one-time-only use passcode comprising a single term/code or a multi term/code, such as a two- or three-word pass phrase. Further, call management platform communicates the passcode to an online network resource (e.g., website) and/or a mobile application, each of which are associated with the calling entity. For example, the online network resource may be a company website affiliated with the calling-party and the mobile application may the company's mobile application or the like.

During the call, in the event the called-party requests identity verification of the calling-party, the called-party is requested to access the online network resource or the mobile application. In order to hasten the called-party in accessing the online network resource or the mobile application the call management platform may communicate a text message or push a mobile application notification to the calling-party that provides a link for entrance to the online network resource or launching the mobile application.

In response to the called-party logging-in (i.e., providing requisite authentication credentials) to the online network resource or the mobile application, the called-party is presented, at the online network resource or within the mobile application, a display of the passcode. In response to displaying the passcode, the calling-party announces the passcode to the called-party. Since the passcode displayed to the called-party is the same passcode announced to the called-party, the identity of the calling-party is deemed to be verified.

In additional alternate embodiments of the invention, during the same telephone call, the calling-party may be provided identity verification of the called-party (i.e., the called-party is, in fact, the party that the calling-entity desires to contact) without the called-party having to announce or otherwise provide any personal information. Specifically, in response to the called-party logging into the online network resource or mobile application, the online network resource or the mobile application generates a single-use (i.e., one-time-only) passcode that is then communicated to the call management platform and displayed to the called-party at the online network resource or the mobile application. Since the called-party previously logged into the online network resource or mobile application, which are associated with the calling-party, the called-party only needs to announce or otherwise provide the passcode to the calling-party. Since the passcode announced by the called-party is the same passcode that was communicated to the call management platform, the identity of the called-party is deemed to be verified.

Figure 1:
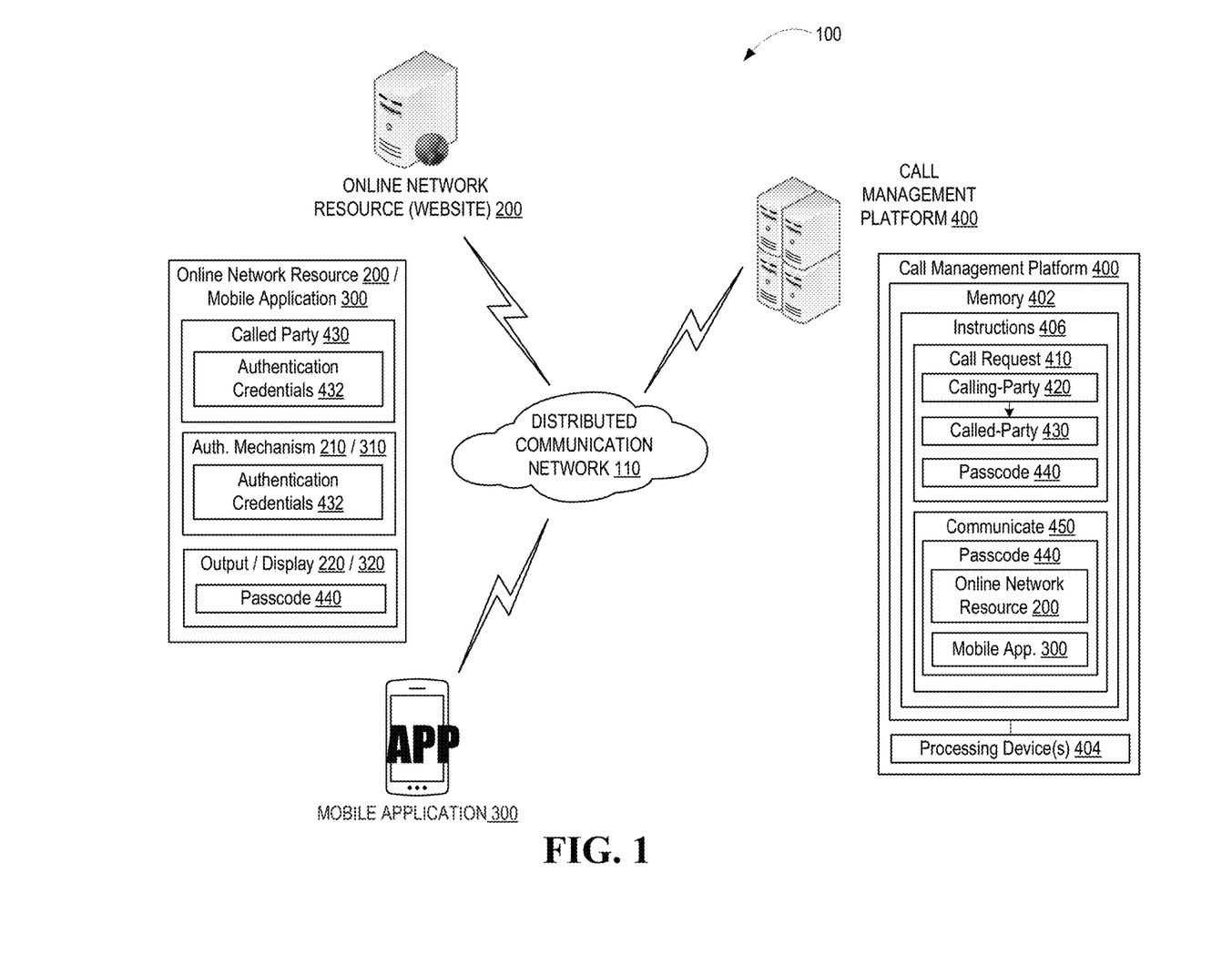
FIG. 1 is a schematic diagram of a system for providing a called-party with identity verification of a calling-party, in accordance with embodiments of the present invention.

Referring to FIG. 1, a schematic diagram of a system 100 for providing a called-party with identify verification of a calling-party, in accordance with embodiments of the present invention. The system 100 is operated in a distributed communication network 110, which may include the Internet and one or more intranets or the like. The system includes at least one of an online network resource 200, such as a website or the like and a mobile application 300. Each of the online network resource 200 and the mobile application 300 are associated/affiliated with the calling-party 420. For example, in those embodiments in which the calling-party 420 is a financial institution or a merchant, the online network resource 200 may be an online banking site, a merchant site or the like and the mobile application 300 may be a mobile banking application, a merchant application or the like.

The system additionally includes a call management platform 400 otherwise referred to as a customer relations management system or the like. The call management platform 400 includes a memory 402 that is in communication with one or more processing devices 404. Memory 402 may comprise volatile and non-volatile memory, such as read-only and/or random-access memory (RAM and ROM), EPROM, EEPROM, flash cards, or any memory common to computing platforms). Moreover, memory 402 and the like may comprise cloud storage, such as provided by a cloud storage service and/or a cloud connection service. Processing device(s) 404 may be an application-specific integrated circuit ("ASIC"), or other chipset, logic circuit, or other data processing device configured to implement artificial intelligence including machine learning techniques. Processing device(s) 404 or the like may execute one or more application programming interface (APIs) (not shown in FIG. 1) that interface with any resident programs or the like stored in the memory 402 of the call management platform 400 and any external programs. Processing device(s) 404 may include various processing subsystems (not shown in FIG. 1) embodied in hardware, firmware, software, and combinations thereof, that enable the functionality of the call management platform 400 and the operability of the platform 400 on the distributed communications network 110. For example, processing subsystems allow for initiating and maintaining communications and exchanging data with other networked devices, such as online network resources 200 and mobile application 300.

Call management platform 400 additionally includes a communications module (not shown in FIG. 1) embodied in hardware, firmware, software, and combinations thereof, that enables electronic communications between the computing platform 400 and other network devices, such as, but not limited to, online network resources 200 and mobile applications 300. Thus, communication module may include the requisite hardware, firmware, software and/or combinations thereof for establishing and maintaining a network communication connection with one or more network devices.

The memory 402 of call management platform 400 stores instructions 406, which are executable by the processing device(s) 404. The instructions 406 are configured to receive call request 410 that requests for a calling-party 420 to initiate a telephone call with a called-party 430. The calling-party 420 is used herein is a company or other large enterprise, as well as, the agent/associate employed by the company or large enterprise that is placing the telephone call. The called-party 430 as used herein is one or more individuals, such as clients/customers, vendors, third-party entities or the like that the calling-party 420 has a need to contact.

The instructions 406 are further configured to associate a passcode 440 with the call request 410 and communicate 450 the passcode 440 to at least one of the online network resource 200 and the mobile application 300. The passcode 440 may be a two or three-word passcode or any other passcode that is configured to be easily announced by the calling-party during the telephone call. In specific embodiments of the system, the call management platform 400 or some ancillary application is configured to generate the passcode 440. In such embodiments the passcode may be a one-time-only use passcode that is specific to the call request 410. In other embodiments of the invention, the passcode 440 may be a passcode assigned to or associated with the calling-party 420 (i.e., the agent/associate making the call) and, thus may be used repeatedly by the agent/associate for purposes of calling-party identity verification.

Figure 2:
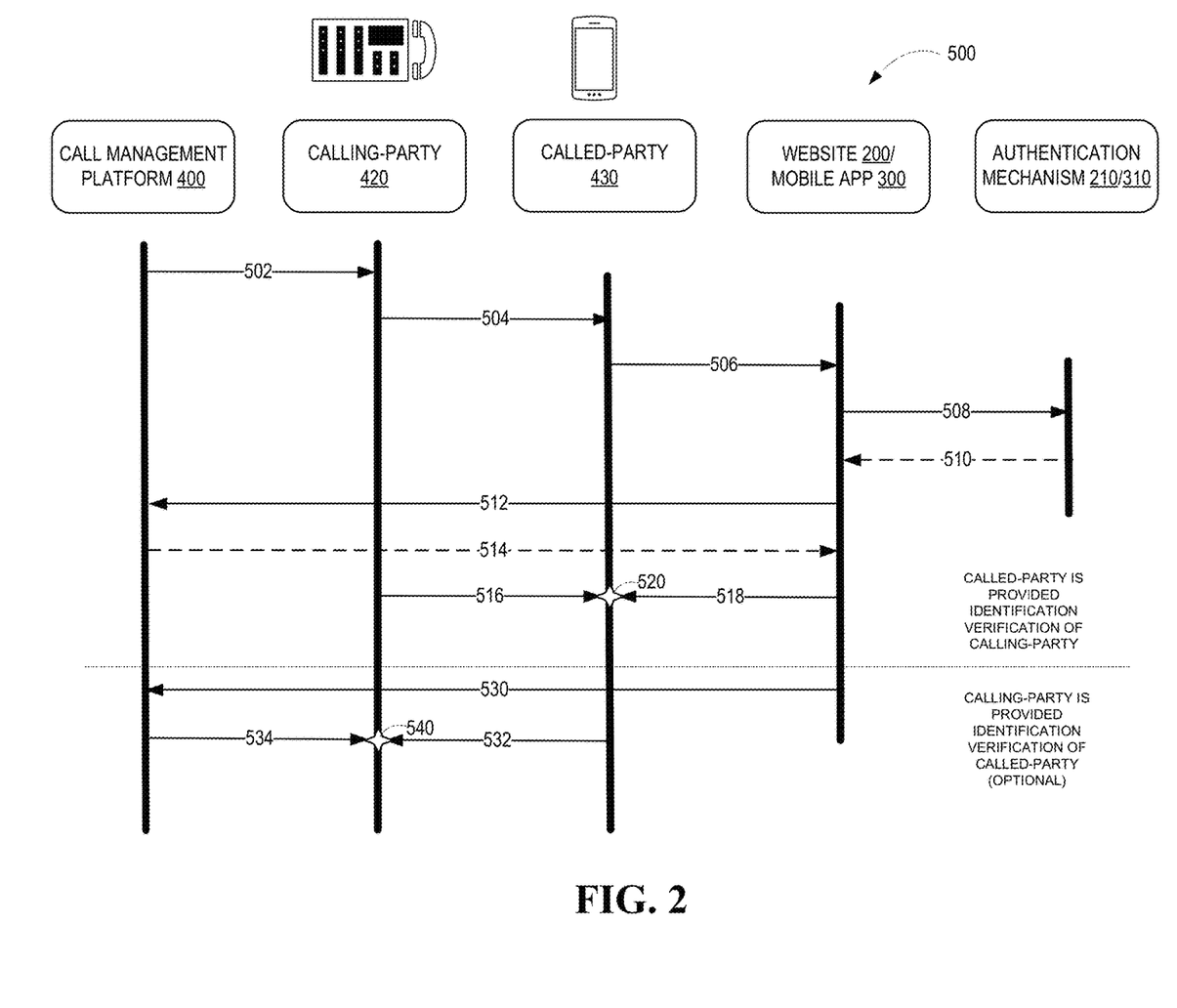
FIG. 2 is a swim lane diagram of a method for providing a called-party with identity verification of a calling-party and, optionally, providing the calling-party with identity verification of the called-party in accordance with some embodiments of the present disclosure.

As shown in FIG. 2 described infra., in specific embodiments of the invention, the communication 450 of the passcode 440 to the online network resource 200 and/or the mobile application 300 may occur during the telephone call, after the called-party has accessed the online network resource 200 or the mobile application 300 and the called-party has been authenticated. In such embodiments of the invention, after the called-party has been authenticated, the online network resource 200 and/or the mobile application may communicate a request to the call management platform 400 for the passcode and, in turn, the call management platform 400 communicates the passcode to the online network resource 200 and/or the mobile application 300. In other embodiments of the invention, the passcode 440 may be communicated to the online network resource 200 and/or the mobile application 300 at any point in time after the passcode 440 has been associated with the call request 410.

The online network resource and the mobile application are configured to, in response to the called-party 430 accessing one of the online network resource 200 or the mobile application 300 during the telephone call, (a) receive authentication credentials 432 from the called-party 430, (b) implement an authentication mechanism 210, 310 to authenticate the called-party 430 based on the authentication credentials 432 and, in response to authentication, (c) output/display 220, 320, on a called-party device at the online resource 200 or within the mobile application 300, the passcode 440.

The authentication credentials 432 are any credentials used by the online network resource or mobile application for authenticating (i.e., logging-in or signing-in) a user, such as conventional username and passcode or biometric credentials, such as fingerprint, facial recognition or the like.

The output/display 220, 320 may include visual display of the passcode 440, or in some instances, as configured by the called-party 430, audible output of the passcode 440. In addition to outputting/displaying the passcode 440, the name of the agent/associate of the calling-party 420 and the department that the agent/associate represents may be displayed/outputted. Additionally, in other embodiments of the invention, the output/display 220, 320 may be configured to display a hyperlink, which upon activation, provides the called-party with an ability to review the call (i.e., provide feedback or the like).

In response to displaying the passcode 440 to the called-party 430, the calling-party 420 announces the passcode 440 to the called-party, which matches the passcode 440 displayed on the called-party device. As a result, the called-party is provided with the requisite identity verification of the calling-party (i.e., the called-party has assurance that the calling-party is, in fact, the party that the calling-party asserts it to be).

Referring to FIG. 2, a swim-lane diagram is presented of a method 500 for providing a called-party 430 with identify verification of a calling-party 420 and providing a calling-party 420 with identity verification of the called-party 430, in accordance with specific embodiments of the invention. At Event 502, a call request is received by the call management platform 400 that requests the calling of a called-party 430 and is assigned to a calling-party 420 (i.e., an agent/associate within the enterprise or company or the like). Once the call request is received, the call request is assigned a first passcode, such as two- or three-word passcode or any other passcode that can readily be announced to and recalled by a called-party during a call.

At Event 504 the calling-party 420 initiates the telephone call with the called-party 430 and informs the called-party that they are calling on behalf of the calling-party and, if the called-party would like to verify the identity of the calling-party the called-party can access the online network resource 200 or the mobile application 300. To expedite the process, the call management platform 400 may, in some embodiments of the invention, communicate a text message to the called-party 430 that includes a link to the online network resource/website 200. Alternatively, if the called-party desires to use the mobile application, the call management platform 400 may instruct the mobile application 300 to push a notification to the called-party's device that provides access to the mobile application 300.

At Event 506, the called-party 430 accesses the online network resource/website 200 or the mobile application 300. It should be noted that the called-party 430 is provided an online network resource/website address (i.e., either announced by the calling-party or via the hyperlink in the text message) that allows the called-party 430 to enter the online network resource/website 200 at an entry point/webpage (e.g., an authentication page) for calling-party identity verification. Similarly, the mobile application notification is configured to provide the called-party 430 access to the specific entry point (e.g., authentication point) of the mobile application 300 designated for calling-point identity verification. Moreover, it should be noted that the called-party 430 may access the online network resource/website 200 or mobile application on the same device (i.e., smart mobile phone with Internet access) on which the call is occurring or, in other embodiments, on a different device (e.g., call placed to a landline phone and the called-party accesses the website via a mobile device, laptop, personal computer or the like).

At Event 508, the called-party enters authentication credentials, such as conventional username and password and/or biometric credentials (e.g., fingerprint, face image or the like) as dictated by online network resource/website 200 or mobile application 300 configuration, as well as, in some instances, called-party configuration. The authentication credentials are received by an authentication mechanism 210, 310 which compares that input to known authentication credentials to confirm the identity of the called-party and, at Event 510, authorize the called-party to proceed.

In response to authentication, at Event 512, the online network resource/website 200 or mobile application 300 communicates a request to the call management platform 400 for the first passcode assigned/associated with the call request. At Event 514, the call management platform 400 returns the passcode to the online network resource/website 200 or the mobile application 300 and outputs/displays the passcode to the called-party 430 at the online/network resource/website 200 or within the mobile application 300.

At Event 516, the calling-party 420 announces the first passcode to the called-party 430 and, at Event 518 the called-party verifies that the announced first passcode is a match 520 to the first passcode displayed. The verification of the match 520 provides the called-party 430 with identity verification of the calling-party 420.

In accordance with optional embodiments of the invention, at Event 530, in response to the called-party being authenticated by the authentication mechanism 210, 310, the online network resource/website or mobile application generates or otherwise receives a one-time-only/single use second passcode, displays the second passcode to the called-party and communicates the second passcode to the call management platform 400. At Event 532, in response to the call management platform 400 displaying the second passcode to the calling-party, the called-party announces the second passcode to the called party. At Event 534, the calling-party verifies that the announced second passcode displayed is a match 540 to the second passcode displayed. The verification of the match 540 provides the calling-party 420 with identity verification of the called-party 430. As a result of the methodology described in relation to FIG. 2, both the called-party and the calling-party are cable of verifying the identity of the other party without having to exchange any personal information during the telephone call.

Figure 3:
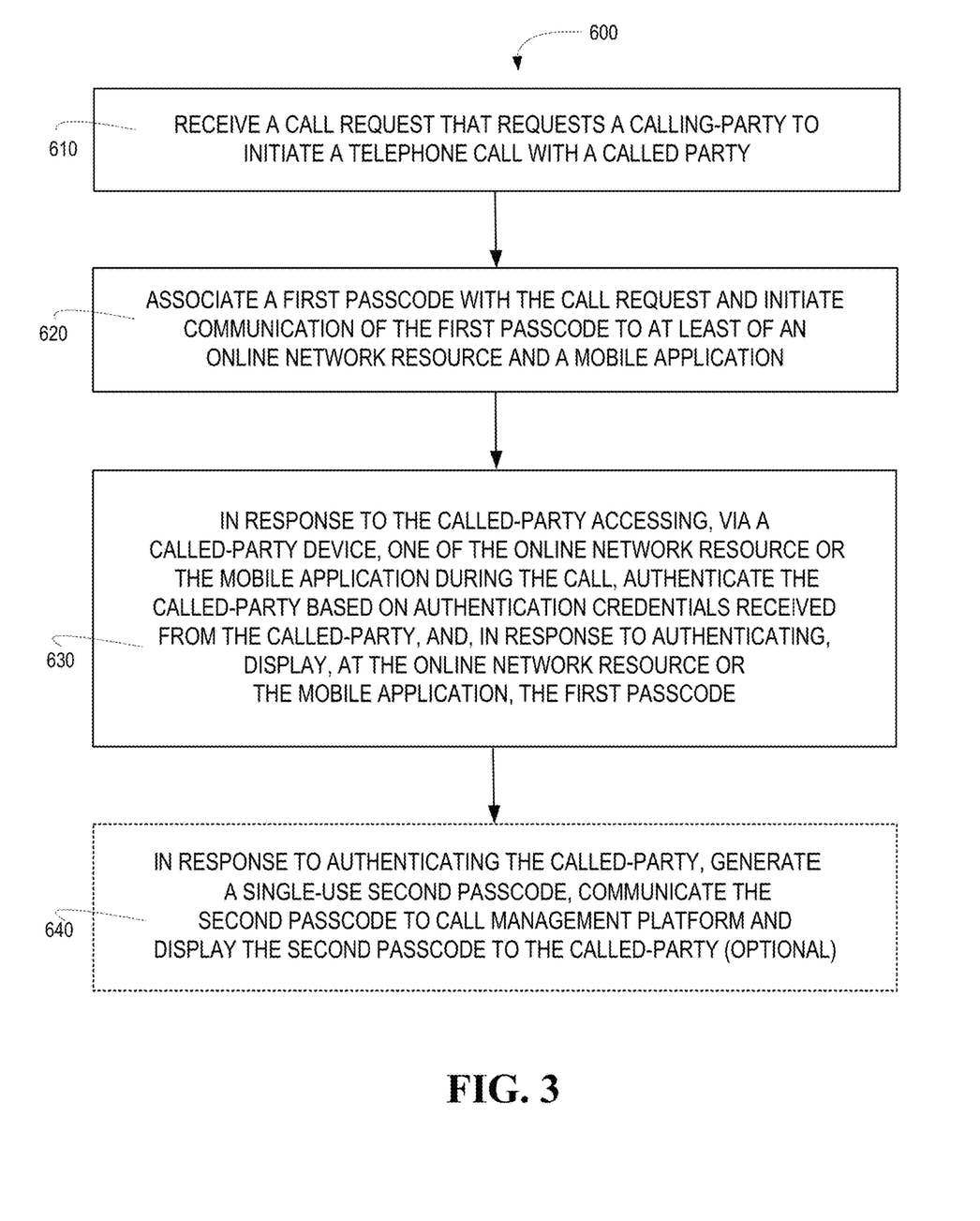
FIG. 3 is a flow diagram of a method for providing a called-party with identity verification of a calling-party and, optionally, providing the calling-party with identity verification of the called-party in accordance with some embodiments of the present disclosure.

Referring to FIG. 3, a flow diagram is presented of a method 600 for providing a called-party with identify verification of a calling-party and, optionally, providing a calling-party with identity verification of the called-party, in accordance with specific embodiments of the invention. At Event 610, a call request is received that requests a calling-party to initiate a telephone call with a called party. As used herein, the calling-party is a company or other large enterprise, as well as, the agent/associate employed by the company or large enterprise that is placing the telephone call. The called-party, as used herein, is one or more individuals, such as clients/customers, vendors, third-party entities or the like that the calling-party has a need to contact.

At Event 620, a first passcode is associated with/assigned to the call request and communicated to at least one of the online network resource/website and the mobile application. The first passcode may be a two- or three-word passcode or any other passcode that is configured to be easily announced by the calling-party during the telephone call. In specific embodiments of the method, the first passcode is generated as a one-time-only use passcode that is specific to the call request. In other embodiments of the method, the first passcode may be a passcode assigned to or associated with the calling-party (i.e., the agent/associate making the call) and, thus may be used repeatedly by the agent/associate for purposes of calling-party identity verification.

In specific embodiments of the method, communication of the first passcode to the online network resource/website and/or the mobile application occurs during the telephone call, after the called-party has accessed the online network resource or the mobile application and the called-party has been authenticated. In such embodiments of the invention, after the called-party has been authenticated, the online network resource/website and/or the mobile application may communicate a request to the call management platform for the first passcode and, in turn, the call management platform communicates the first passcode to the online network resource and/or the mobile application. In other embodiments of the invention, the first passcode may be communicated to the online network resource and/or the mobile application at any point in time after the first passcode has been associated with the call request.

At Event 630, in response to the called-party accessing, during the telephone call, either the online network resource or the mobile application, (a) the authentication credentials are received from the called-party, (b) the called-party is authenticated based on the authentication credentials and, in response to authentication, (c) the first passcode is outputted/displayed to the called party at the online resource or within the mobile application. The output/display may include visual display of the first passcode, or in some instances, as configured by the called-party, audible output of the passcode. In addition to outputting/displaying the passcode, in specific embodiments of the method, the name of the agent/associate of the calling-party and/or the department that the agent/associate represents may be displayed/outputted. Additionally, in other embodiments of the method, the output/display may include display of a hyperlink, which upon activation, provides the called-party with an ability to review the call (i.e., provide feedback or the like).

In response to displaying the passcode to the called-party, the calling-party announces the passcode to the called-party, which matches the passcode displayed on the called-party device. As a result, the called-party is provided with the requisite identity verification of the calling-party (i.e., the called-party has assurance that the calling-party is, in fact, the party that the calling-party asserts it to be).

At optional Event 640, in response to the called-party being authenticated, the online network resource/website or mobile application generates or otherwise receives a one-time-only/single use second passcode, displays the second passcode to the called-party and communicates the second passcode to the call management platform. In response to the call management platform displaying the second passcode to the calling-party, the called-party announces the second passcode to the called party and the calling-party verifies that the announced second passcode displayed is a match to the displayed second passcode. The verification of the match provides the calling-party with identity verification of the called-party.

Thus, present embodiments of the invention provide a called-party with identity verification of the calling-party during a telephone call. The identity verification of the calling-party occurs without the called-party being required to call back at a known called-party number and without the need to exchange personal information. In additional embodiments of the invention, during the call, the calling-party is provided with identity verification of the called-party without the called-party having to provide any personal information. As such embodiments of the invention provide for both the called-party and the called-party to verify the identity of one another without either party being required to provide any personal information.

The features, functions, and advantages that have been discussed may be achieved independently in various embodiments of the present invention or may be combined with yet other embodiments, further details of which can be seen with reference to the following description and drawings.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for providing a called-party with identity verification of a calling-party, the system comprising:
   at least one of (i) an online network resource associated with the calling-party, and (ii) a mobile application associated with the calling-party; and
   a call management platform including a memory and one or more computing processors in communication with the processor, wherein the memory stores instructions that are executable by one or more computing processors and configured to:
      receive a call request that requests the calling-party to initiate a telephone call with the called-party, and
      associate a first passcode with the call request and initiate communication of the first passcode to at least one of the online network resource and the mobile application, wherein the online network resource and the mobile application are configured to:
         in response the called-party accessing one of the online network resource or the mobile application during the telephone call:
            receive authentication credentials from the called-party, and
            in response to authenticating the called-party based on the authentication credentials, display, on a called-party device, the first passcode,
      wherein in response to displaying the first passcode, the calling-party announces the first passcode to the called-party and a match between the displayed first passcode and the announced first passcode provides the called-party with identity verification of the calling-party.

2. The system of claim 1, wherein the online network resource and the mobile application are configured to:
   in response to authenticating the called-party, generate a single-use second passcode,
   communicate the second passcode to the call management platform, and
   display the second passcode to the called-party,
   wherein the called-party announces the second passcode to the calling-party and the calling-party matches the announced second passcode with the second passcode previously communicated to the call management platform to provide called-party identity verification to the calling-party.

3. The system of claim 1, wherein the call management system is further configured to generate the first passcode, wherein the first passcode is specific to the telephone call.

4. The system of claim 3, wherein the call management system is further configured to generate the first passcode in response to initiating the telephone call and display, on a calling-party device, the first passcode.

5. The system of claim 1, wherein the call management system is further configured to initiate communication of a text message to the called-party, wherein the text message is configured to include a hyperlink that is configured to provide the called-party entrance to the online network resource.

6. The system of claim 5, wherein the call management system is further configured to initiate communication of the text message to the called-party during the telephone call or prior to the telephone call.

7. The system of claim 1, wherein the call management system is further configured to signal the mobile application to display a mobile application notification that is configured to receive a user input that launches the mobile application.

8. The system of claim 7, wherein the call management system is further configured to signal the mobile application to display a mobile application notification during the telephone call or prior to the telephone call.

9. The system of claim 1, wherein the call management platform is further configured to:
   initiate communication of the first passcode and a name of the calling-party to the at least one of the online network resource and the mobile application, and
   wherein the online network resource and the mobile application are further configured to display, on the called-party device, the first passcode and the name of the calling-party.

10. A computer-implemented method for providing a called-party with identity verification of a calling-party, the method executed by one or more computing device processors and comprising:
    receiving an input that requests the calling-party to initiate a telephone call with the called-party;
    associating a first passcode with the call request and initiating communication of the first passcode to at least one of an online network resource associated with the calling-party and a mobile application associated with the calling-party, in response to the called-party accessing, via a called-party device, one of the online network resource or the mobile application during the call:
receiving, at the online network resource or the mobile application, authentication credentials from the called-party;
authenticating the called-party based on the authentication credentials, and
in response to authenticating the called-party, displaying, at the online network resource or within the mobile application, the first passcode,
wherein in response to displaying the first passcode, the calling-party announces the first passcode to the called-party and a match between the displayed first passcode and the announced first passcode provides the called-party with identity verification of the calling-party.

11. The computer-implemented method of claim 10, further comprising:
in response to authenticating the called-party, generating, at the online network resource or within the mobile application, a single use second passcode;
communicating the second passcode to the call management platform; and
displaying, on the called-party device, the second passcode,
wherein the called-party announces the second passcode to the calling-party and the calling-party matches the announced second passcode with the second passcode previously communicated to the call management platform to provide called-party identity verification to the calling-party.

12. The computer-implemented method of claim 10, further comprising:
generating the first passcode in response to initiating the telephone call, and
displaying, on a calling-party device, the first passcode.

13. The computer-implemented method of claim 10, further comprising:
initiating communication of a text message to the called-party, wherein the text message is configured to include a hyperlink that is configured to provide the called-party entrance to the online network resource.

14. The computer-implemented method of claim 10, further comprising:
signaling the mobile application to display a mobile application notification that is configured to receive a user input that launches the mobile application.

15. The computer-implemented method of claim 10, wherein:
initiating communication of the first passcode further comprises initiating communication of the first passcode and a name of the calling-party to the at least one of the online network resource and the mobile application, and
displaying, at the online network resource or within the mobile application, the first passcode, further comprises displaying, at the online network resource or within the mobile application, the first passcode and the name of the calling-party.

16. A computer program product comprising a non-transitory computer-readable medium including:
a first set of codes for causing a computer processor to receive a call request that requests the calling-party to initiate a telephone call with the called-party;
a second set of codes for causing a computer processor to associate a first passcode with the call request and initiate communication of the first passcode to at least one of an online network resource associated with the calling-party and a mobile application associated with the calling-party;
a third set of codes for causing a computer processor, in response the called-party accessing, via a called-party device, one of the online network resource or the mobile application during the call, (a) receive, at the online network resource or the mobile application, authentication credentials from the called-party, and in response to authenticating the called-party based on the authentication credentials, (b) display, at the online network resource or within the mobile application, the first passcode,
wherein in response to displaying the first passcode, the calling-party announces the first passcode to the called-party and a match between the displayed first passcode and the announced first passcode provides the called-party with identity verification of the calling-party.

17. The computer program product of claim 16, wherein the non-transitory computer-readable medium further includes:
a fourth set of codes for causing a computer processor to, in response to authenticating the called-party, generate, at the online network resource or within the mobile application, a single use second passcode;
a fifth set of codes for causing a computer processor to communicate the second passcode to the call management platform; and
a sixth set of codes for causing a computer processor to display, on the calling-party device, the second passcode,
wherein the called-party announces the second passcode to the calling-party and the calling-party matches the announced second passcode with the second passcode previously communicated to the call management platform to provide called-party identity verification to the calling-party.

18. The computer program product of claim 16, wherein the non-transitory computer-readable medium further includes:
a fourth set of codes for causing a computer processor to generate the first passcode in response to initiating the telephone call, and
a fifth set of codes for causing a computer processor to display, on a calling-party device, the first passcode.

19. The computer program product of claim 16, wherein the non-transitory computer-readable medium further includes:
a fourth set of codes for causing a computer processor to initiate communication of a text message to the called-party, wherein the text message is configured to include a hyperlink that is configured to provide the called-party entrance to the online network resource.

20. The computer program product of claim 16, wherein the non-transitory computer-readable medium further includes:
a fourth set of codes for causing a computer processor to signal the mobile application to display a mobile application notification that is configured to receive a user input that launches the mobile application.

* * * * *